US007664518B2

(12) United States Patent
Takahashi et al.

(10) Patent No.: US 7,664,518 B2
(45) Date of Patent: Feb. 16, 2010

(54) GROUP CALL SERVER, GROUP CALL SYSTEM, TERMINAL, AND GROUP CALL CONTROL METHOD

(75) Inventors: Rei Takahashi, Tokyo (JP); Tomohiro Ando, Yokohama (JP); Takeshi Iitaka, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 500 days.

(21) Appl. No.: 11/580,953

(22) Filed: Oct. 16, 2006

(65) Prior Publication Data

US 2007/0087769 A1   Apr. 19, 2007

(30) Foreign Application Priority Data

Oct. 17, 2005   (JP)   ............................ P2005-301924

(51) Int. Cl.
   *H04B 7/00* (2006.01)
(52) U.S. Cl. ................................. 455/518; 455/404.2
(58) Field of Classification Search ................. 455/518, 455/419, 519, 414.3
   See application file for complete search history.

(56) References Cited

U.S. PATENT DOCUMENTS

| 6,163,692 A | 12/2000 | Chakrabarti et al. | |
|---|---|---|---|
| 2005/0192041 A1* | 9/2005 | Oxley et al. | 455/519 |
| 2006/0025122 A1* | 2/2006 | Harris et al. | 455/419 |

FOREIGN PATENT DOCUMENTS

| CN | 1642343 A | 7/2005 |
|---|---|---|
| JP | 2001-195762 | 7/2001 |
| KR | 10-2004-0069373 | 8/2004 |
| WO | WO 99/66757 | 12/1999 |
| WO | WO 01/31968 A1 | 5/2001 |
| WO | WO 2005/034497 A1 | 4/2005 |
| WO | WO 2005/057890 A2 | 6/2005 |

OTHER PUBLICATIONS

"Push to Talk Over Cellular(PoC)-Architecture", OMA Open Mobile Alliance, XP-002372965. Draft Version 1.0, Nov. 17, 2004, pp. 1-152.

* cited by examiner

*Primary Examiner*—Tu X Nguyen
(74) *Attorney, Agent, or Firm*—Oblon, Spivak, McClelland, Maier & Neustadt, L.L.P.

(57) ABSTRACT

An object of the present invention is to be able to rejoin a group call by spontaneous operation from the terminal side at an optional timing.

The group call server provides a plurality of mobile communications terminals with a function of a group call between the terminals through a communications network, and comprises: an ID granting unit that grants the group call to be established a call ID that identifies the group call; an ID notification unit that gives the terminals participating in the group call to be established the call ID granted to the group call by the ID granting unit; a rejoin request receiving unit that receives requests to rejoin the group call that have been transmitted from a terminal disconnected from the group call and that include the call ID; and a rejoin control unit that allows the terminal that transmitted the request to rejoin the group call related to the call ID included in the rejoin request received by the rejoin request receiving unit.

3 Claims, 5 Drawing Sheets

GROUP CALL SERVER, GROUP CALL SYSTEM, TERMINAL, AND GROUP CALL CONTROL METHOD

BACKGROUND OF THE INVENTION

1. Field of the Invention

The present invention relates to a group call server, which provides a plurality of terminals with a function of a group call between the terminals .through a communications network, a group call system configured by comprising the group call server, a terminal, and a group call control method for the group call server, group call system and terminal.

2. Description of the Related Art

Group calls, in which a plurality of users converse using communications terminals through a communications network, have been realized, for example, in telephone conferencing systems, television conferencing systems and the like. Moreover, in the past there have been proposals for systems that use a server as a method to realize group calls in a mobile communications network (for example, refer to Japan Patent Application Laid-open No. 2001-195762). Disclosed in Japan Patent Application Laid-open No. 2001-195762 is a method that not only realizes a group call, but allows a terminal that has been disconnected from the group call for such reasons as being out of the coverage area to reconnect to (rejoin) the group call. Specifically, that method sends a reconnection request (request to rejoin) from the server to the terminal disconnected from the group call, and the terminal receives the reconnection request.

SUMMARY OF THE INVENTION

Nevertheless, the technology described in Japan Patent Application Laid-open No. 2001-195762 has the problems that the user cannot spontaneously conduct the operations, that the timing for rejoining is limited, and that it is not always possible to rejoin the group call at a suitable timing.

The present invention was made to resolve the aforementioned problems, and an object is to provide a group call server, group call system, terminal, and group call control method that can allow rejoining a group call by spontaneous operation from the terminal side and at an optional timing.

The group call server related to the present invention is a group call server that provides a plurality of terminals with a function of a group call between the terminals through a communications network, comprising: ID granting means for granting to a group call to be established a call ID that identifies the group call; ID notification means for giving the terminals participating in the group call to be established notification of the call ID that the ID granting means has granted to the group call; rejoin request receiving means for receiving a request to rejoin the group call, the request being sent from a terminal disconnected from the group call and containing the call ID; and rejoin control means for allowing terminals that have sent the rejoin request to rejoin the group call related to the call ID contained in the rejoin request received by the rejoin request receiving means.

The group call server related to the present invention receives the rejoin request sent from the terminal disconnected from the group call and allows the related terminal to rejoin the group call based on the related rejoin request. Included in the rejoin request is a call ID that identifies the group call in which the terminal has been participating; and rejoining is conducted in relation to the group call in which the related terminal had been participating. Specifically, according to the group call server of the present invention, the rejoin request from the terminal is transmitted as a trigger, and therefore, rejoining the group call is possible by spontaneous operation and optional timing of the terminal side.

Moreover, preferably the group call server further comprises a status notification means for giving terminals disconnected from the group call notification of the group call status. According to this configuration, a terminal that had participated in the group can determine whether or not that group call is continuing, and therefore, wasted rejoin requests can be prevented.

In addition to being described as the invention of a group call server as stated above, the present invention can also be described as the invention of a group call system comprising the related group call server and a plurality of terminals as described below. These are substantially the same invention, and the actions and effects are the same.

The group call system related to the present invention is a group call system configured to include: a group call server that provides a plurality of terminals with a function of a group call between the terminals through a communications network; and a plurality of terminals that conduct the group call by receiving provision of a group call function from the group call server, wherein the group call server comprises: ID granting means for granting to a group call to be established a call ID that specifies the group call; ID notification means for giving the terminals participating in the group call to be established notification of the call ID that the ID granting means has granted to the group call; rejoin request receiving means for receiving a request to rejoin the group call, the request being sent from a terminal disconnected from the group call and containing the call ID; and rejoin control means for allowing a terminal that has sent the rejoin request to rejoin the group call related to the call ID contained in the rejoin request received by the rejoin request receiving means; and the terminal comprises: ID acquisition means for acquiring the call ID assigned by the group call server to a group call in which the terminal itself participates; and a rejoin request transmission means for transmitting a request to rejoin the group call containing the call ID acquired by the ID acquisition means.

Preferably, the communications network is a mobile communications network, and the terminal further comprises request transmission control means for determining whether or not the terminal itself is positioned in the communications area of the mobile communications network, and controls the rejoin request transmission means such that a rejoin request is transmitted based on the determination. According to this configuration, it is possible for a terminal that has been disconnected from a group call based on leaving the communications area of the mobile communications network to automatically rejoin the group call, thus improving the convenience of group calls on the mobile communications network.

Preferably, the terminal of the group call system further comprises: history data storage means for storing the communications history related to the group calls in which the terminal itself has participated, in conjunction with the call ID related to the group call; and rejoin request generation means for referencing the communications history stored by the history data storage means, and generating a rejoin request to be sent by the rejoin request transmission means. According to this configuration, it is possible to easily transmit a rejoin request from the terminal to the group call server, and rejoining from the terminal can be easily accomplished.

Moreover, the terminal itself of the group call system also has a novel point. Specifically, the terminal related to the present invention is a terminal that conducts group calls by receiving from a group call server provision of a function of a group call between a plurality of terminals through a communications network, further comprising: a group call function control means for participating in a group call by sending a group call start request to the group call server, or by receiving a participation request sent from the aforementioned group call server based on the group call start request from a terminal other than the terminal itself; ID acquisition means for acquiring a call ID, which identifies the group call and is assigned by the group call server to the group call to be joined via the group call function control means; and rejoin request transmission means for transmitting a request to rejoin the group call, which includes the call ID acquired by the ID acquisition means.

In addition to being described as the invention of a group call server and a group call system as stated above, the present invention may also be described as the invention of a group call control method of a group call server, group call system, and terminal as described below. These are substantially the same invention, and the actions and effects are the same.

The group call control method related to the present invention is a group call control method of a group call server that provides a plurality of terminals with a function of a group call between the terminals through a communications network, the method comprising the steps of: ID granting that grants to a group call to be established a call ID that identifies the group call; ID notifying that gives the terminals participating in the group call to be established notification of the call ID granted to the group call in the ID granting step; rejoin request receiving that receives a request to rejoin the group call, the request being sent from a terminal disconnected from the group call and containing the call ID; and rejoin controlling that allows a terminal that has sent the applicable rejoin request to rejoin the group call related to the call ID contained in the rejoin request received in the rejoin request receiving step.

The group call control method related to the present invention is a group call control method of a group call system configured to include: a group call server that provides a plurality of terminals with a function of a group call between the terminals through a communications network; and a plurality of terminals that conduct a group call by receiving provision of a group call function from a group call server, wherein the group call server comprises the steps of: ID granting that grants to a group call to be established a call ID that identifies the group call; ID notifying that gives the terminals participating in the group call to be established notification of the call ID granted to the group call in the ID granting step; rejoin request receiving that receives a request to rejoin the group call, the request being sent from a terminal disconnected from the group call and containing the call ID; and rejoin controlling that allows a terminal that has sent the rejoin request to rejoin the group call related to the call ID contained in the rejoin request received in the rejoin request receiving step; and the terminal comprises the steps of: ID acquiring to acquire the call ID assigned by the group call server to a group call in which the terminal itself participates; and rejoin request transmitting to transmit a request to rejoin the group call containing the call ID acquired by the ID acquiring step.

The group call control method related to the present invention is a group call control method of a terminal that conducts group calls by receiving from a group call server provision of a function of a group call between a plurality of terminals through a communications network, further comprising the steps of: group call function controlling that participates in a group call by sending a group call start request to a group call server, or by receiving a participation request sent from the aforementioned group call server based on the group call start request from a terminal other than the terminal itself; ID acquiring to acquire the call ID, which identifies the group call and is assigned by the group call server to the group call to be joined in the group call function controlling step; and rejoin request transmitting that transmits a request to rejoin the group call, which includes the call ID acquired in the ID acquiring step.

According to the present invention, rejoining is triggered by the transmission of a rejoin request from the terminal side, and therefore it is possible to rejoin the group call by spontaneous operations and with optional timing.

DESCRIPTION OF THE PREFERRED EMBODIMENTS

An optimal embodiment of the present invention will be explained in detail below using diagrams. When describing the diagrams, the same elements will be given the same codes and redundant explanations will be omitted.

Figure 1:
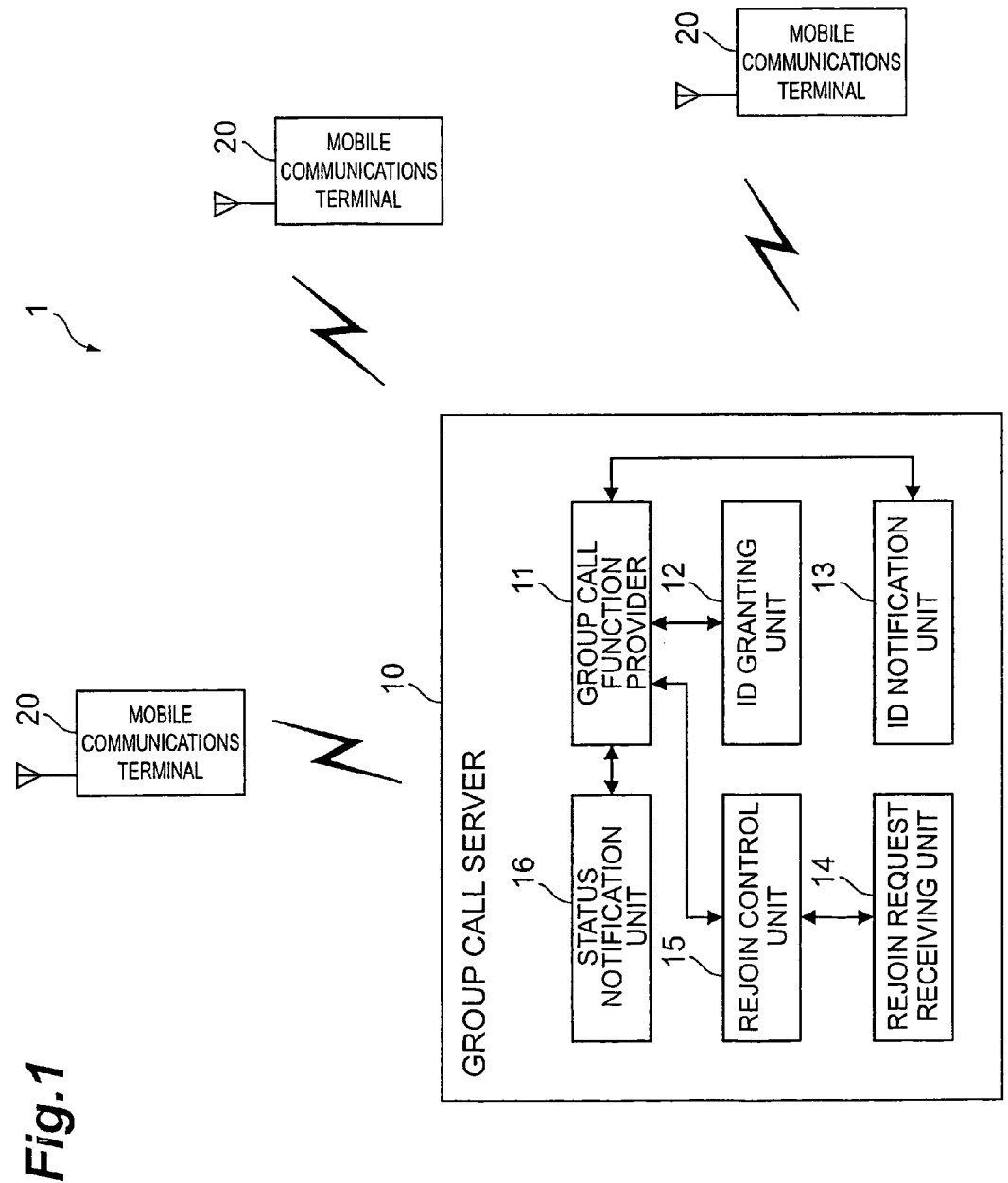
FIG. 1 is a diagram indicating the configuration of a group call system comprising a group call server 10 and a mobile communications terminal 20 related to an embodiment of the present invention.

FIG. 1 indicates the configuration of an embodiment of the group call system 1 according to the present invention. The group call system 1 comprises a group call server 10 and multiple mobile communications terminals (terminals) 20. The group call server 10 is connected to a mobile communications network (not indicated in the diagram), and provides a group call function for the mobile communications terminals 20 to the related mobile communications terminal 20 partners through the mobile communications network. Concretely, the group call server 10 is realized by a server apparatus configured, for example, by a CPU, memory and the like. Further, it is not always necessary for the group call server 10 to be configured by a single server apparatus, and, for example, apparatuses that configure a mobile communications network such as packet nodes (part of the functions), for example, may be comprised as configuring elements.

The mobile communications terminal 20 is an apparatus that can connect to the mobile communications network and can conduct mobile communications, concretely, a portable telephone and the like configured by a CPU, memory, and a wireless communications module are suitable. The mobile communications terminal 20 conducts a group call by receiving the provision of a group call function from the group call server 10.

A group call makes a conversation possible between a plurality of people using a plurality of terminals. Moreover, group calls also include transmitting call data to a plurality of terminals participating in a call using push to talk (PTT). Further, participating in a group call indicates the state when a terminal is provided a group call function from the group call server 10, and can transmit and receive call data that is voice data with another terminal (participating in the group call).

The various elements configuring the group call server 10 and mobile communications terminal 20 will be explained below. As indicated in FIG. 1, the group call server 10 comprises a group call function provider 11, an ID granting unit 12, an ID notification unit 13, a rejoin request receiving unit 14, a rejoin control unit 15, and a status notification unit 16.

The group call function provider 11 is a group call function provision means for providing a group call function to the mobile communications terminals 20. Concretely, the following processing is conducted when assuming that the group call is based on PTT. A group call start request (INVITE) transmitted from a mobile communications terminal 20 (outgoing call terminal) is received, and a participation request based on the related start request is transmitted to a plurality of mobile communications terminals 20 (incoming call terminals, participating terminals) related to the applicable start request. The replies to the participation request from the applicable incoming call terminals are received, and a session is opened between the mobile communications terminals 20 using, for example, a protocol such as SIP (Session Initiation Protocol), and a group call is established. Moreover, voice data (packets), which are call data, are copied and transferred. It is also possible to establish a plurality of group calls, and status control and call rights control of the terminals participating in the group call are also conducted.

The ID granting unit 12 is ID granting means for granting to the group call that is established by the group call function provider 11 a call ID that identifies the group call in question. Concretely, the call ID is, for example, configured by a character string of several to several dozen characters, and is produced and granted such that there is no duplication with the call IDs of other group calls. The call IDs are granted, for example, when triggered by the group call function provider 11 receiving a group call start request from a calling terminal. Control is conducted by transmitting the granted call ID to the group call function provider 11, and correlating with the group call data related to the call ID.

The ID notification unit 13 is ID notification means for giving to the mobile communications terminals 20 participating in the group call established by the group call function provider 11 notification of the call ID granted to the group call in question by the ID granting unit 12. Notification of the call ID is conducted by transmitting the call ID to the mobile communications terminals 20 through the mobile communications network. Transmissions, for example, transmissions to incoming call terminals, are best conducted in conjunction with the timing of the transmission of the group call participation request from the group call function provider 11. Moreover, transmissions to outgoing call terminals are most suitably conducted after a call ID has been granted by the ID granting unit 12.

The rejoin request receiving unit 14 is rejoin request receiving means for receiving requests to rejoin the group call that have been transmitted from mobile communications terminals 20 and include the call ID. The received rejoin request is transmitted to the rejoin control unit 15.

The rejoin control unit 15 is rejoin control means for allowing the mobile communications terminal 20 that transmitted the applicable request to rejoin the group call related to the call ID included in the rejoin request received by the rejoin request receiving unit 14. Concretely, for example, data that identifies the mobile communications terminal 20 and the call ID are notified to the group call function provider 11, and the group call function provider 11 is controlled so as to allow the applicable mobile communications terminal 20 to rejoin the group call related to the related call ID.

The status notification unit 16 is status notification means for giving the mobile communications terminal 20 that has been disconnected from the group call in question notification of the status of the group call. The status to be notified, for example, is the status that the (group call) has ended. Concretely, the notification of the status that the group call has ended is conducted by transmitting to the mobile communications terminal 20 the information to that effect through the mobile communications network at the time when the group call has ended. Moreover, the information that associates the call ID with the mobile communications terminal 20 that has been disconnected from the group call related to the related call ID is controlled by the group call function provider 11, and the mobile communications terminal 20 targeted for transmission is, for example, identified by referring to that information.

Figure 2:
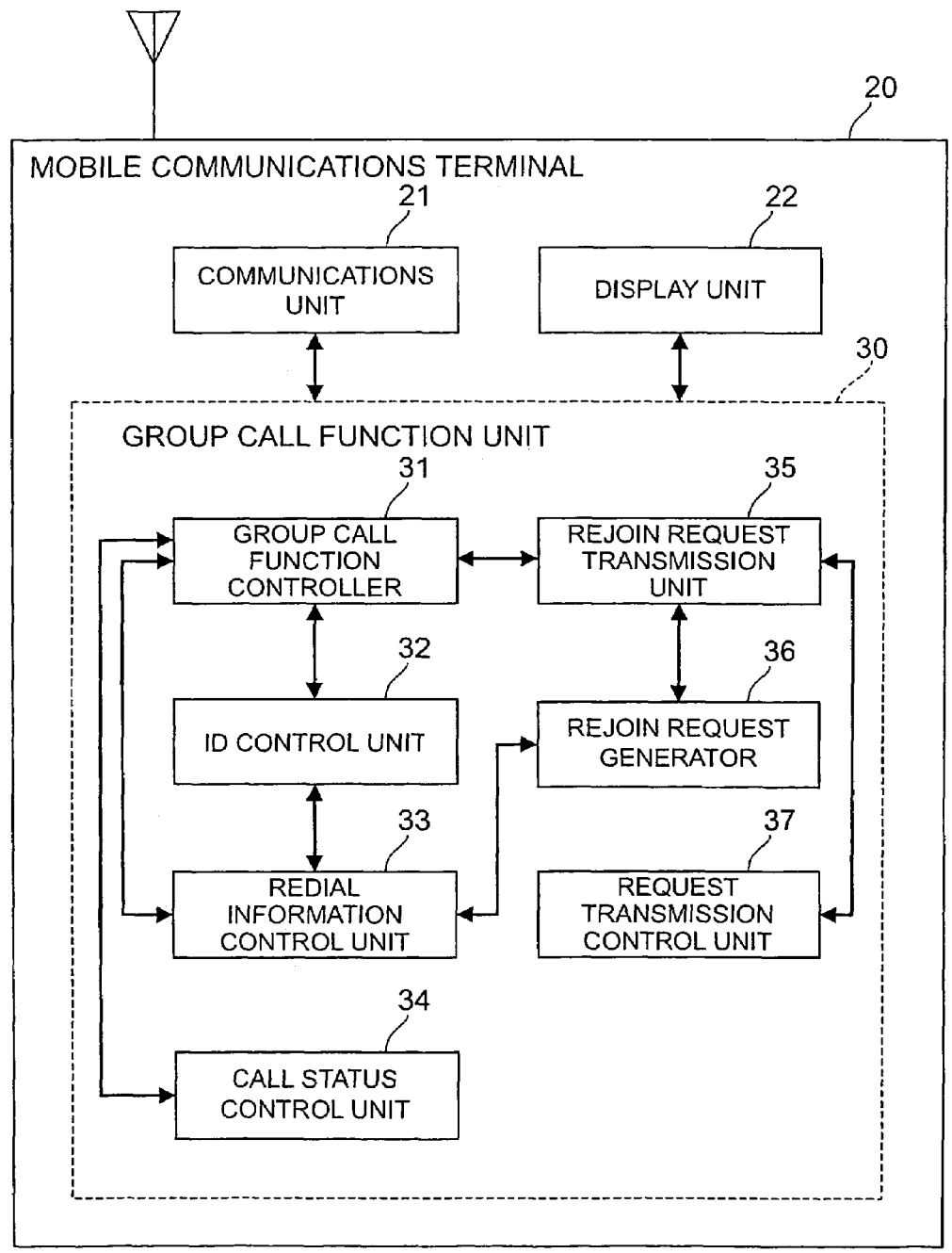
FIG. 2 is a diagram indicating the configuration of the mobile communications terminal 20 related to the embodiment.

As indicated in FIG. 2, the mobile communications terminal 20 is configured to comprise a communications unit 21, a display unit 22, and a group call function unit 30. The communications unit 21 is communication means for connecting to the mobile communications network. The display unit 22 is display means for displaying information related to the group call. Moreover, the display unit 22 is status information output means for displaying status information sent from the group call server 10 regarding the group call in which the terminal is participating. The participating user can know the status of the group call by referring to this display. Further, because it is best if the user knows the status, output may also be conducted by means other than a display, for example, by audio. Information not only of group calls joined in the past, but also information on the status of currently active group calls may be displayed.

The group call function unit 30 executes the group call by receiving a command to provide the group call function, and also controls the communications unit 21 and the display unit 22 as necessary. As indicated in FIG. 2, the group call function unit 30 is configured to comprise a group call function controller 31, an ID manager 32, a redial information manager 33, a call status manager 34, a rejoin request transmission unit 35, a rejoin request generator 36, and a request transmission controller 37.

The group call function controller 31 is group call function control means for participating in a group call by transmitting a group call start request to the group call server 10, or by receiving a participation request transmitted from the group call server 10. Moreover, the group call function controller 31 has primary functions relating to the group call such as accessing the group call server 10 through the mobile communications network and transceiving call data, and controlling the input/output apparatus comprised by the mobile communications terminal 20.

When a local host terminal is participating in a group call, the ID manager 32 is ID acquisition means for acquiring the call ID that the group call server 10 has assigned to the group call in question. Acquisition of the call ID is conducted by receiving the call ID transmitted from the group call server 10. The acquired call ID is stored in the redial information manager 33, and is used to rejoin the group call after having been disconnected.

The redial information manager 33 is historical information storage means for storing the call history relating to the group calls in which the local host terminal has participated, together with the call IDs related to the group call in question. The call ID to be stored is transmitted from the ID manager 32.

The call status manager 34 manages the status of the participation in the group call by the local host terminal and the participant terminals of the group call. The participation status in the group call, for example, may be "connected" when participating, "disconnected" when disconnected, and "not responding" when not responding.

The rejoin request transmission unit 35 is rejoin request transmission means for transmitting a request to rejoin the group call containing the call ID acquired by the ID manager 32. The rejoin request to be transmitted is generated by the rejoin request generator 36. This rejoin request is executed through the mobile communications network, and is triggered by user manipulations or control from the request transmission controller 37.

The rejoin request generator 36 generates rejoin requests based on control from the rejoin request transmission unit 35. The call ID included in the rejoin request to be generated is acquired from the redial information manager 33. Moreover, information identifying the local host terminal such as, for example, the telephone number and the user ID that is defined in advance for every mobile communications terminal 20 is included in the rejoin request to be generated so that the target terminal to be rejoined can be identified.

The request transmission control unit 37 is request transmission control means for monitoring the communications unit 21, determines whether the local host terminal is positioned in the communications area of the mobile communications network, and based on the applicable determination, controls the rejoin request transmission unit 35 to transmit rejoin requests. Concretely, the determination of whether or not the terminal is positioned in the communications area is conducted, for example, based on the strength of the electronic waves received from the ground station of the mobile communications network in the same manner as determining that a portable telephone is in range. Control of rejoin request transmission is conducted if positioned in the communications area. This is because mobile communications and group calling are also possible when positioned in the communications area.

Figure 3:
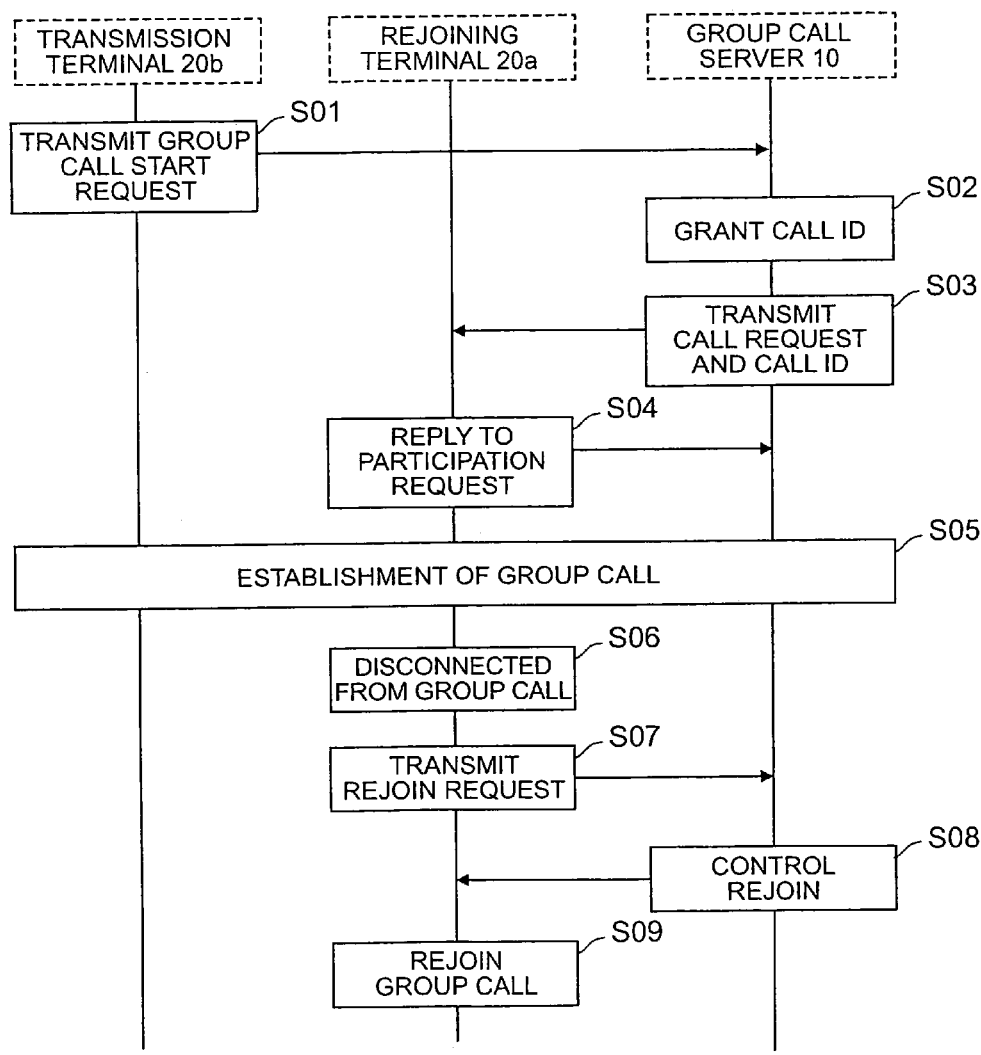
FIG. 3 is a sequence diagram indicating the processing executed by the group call system of the embodiment.

Continuing, the processing executed by the group call system 1 of the present embodiment will be explained below using the sequence diagram in FIG. 3. The present processing is processing to rejoin a group call after the mobile communications terminal 20 has participated in that group call based on the present system 1 and was then disconnected. In the present embodiment, the aforementioned mobile communications terminal 20 shall be called the rejoining terminal 20a. In addition, the mobile communications terminal 20 that transmit a group call start request to the group call server 10 shall be called the outgoing call terminal 20b.

In the present processing, first, the outgoing call terminal 20b transmits a group call start request to the group call server 10 via a mobile communications network (S01). The applicable start request is transmitted based on manipulation of the outgoing call terminal 20b by the user. Contained in the applicable start request is information, specifically, telephone numbers, that identify the addresses of a plurality of mobile communications terminals 20 (incoming call terminal, participating terminal) that are requested to participate in the group call. Here, the rejoining terminal 20a is included among the plurality of addresses of mobile communications terminals 20 (incoming call terminal, participating terminal).

Next, at the group call server 10, the group call function provider 11 receives the applicable start request. The group call function provider 11 gives the ID granting unit 12 notification that there is a group call start request from the outgoing call terminal 20b. The ID granting unit 12 receives that notification, and grants the group call related to the start request from the outgoing call terminal 20b a call ID that that identifies the group call in question (S02). The call ID is generated and granted based on pre-stipulated rules such that no call ID for a group call is duplicated. Concretely, the call ID is, for example, configured by a character string of several to several dozen characters. The call ID is transmitted to the group call function provider 11, and is managed by the group call function provider 11 as a group call related to the start request from the outgoing call terminal 20b.

Next, the ID notification unit 13 gives the plurality of mobile communications terminals 20 that are specified by the information contained in the start request notification of the call ID granted by the ID granting unit 12 (S03). The applicable notification, which is conducted the by the group call function provider 11, is given to the applicable plurality of mobile communications terminals 20 together with the transmission of the request to participate in the group call. At the same time, just the notification of the call ID is given independently to the outgoing call terminal 20b.

The group call function controller 31 gives a reply to the group call server 10 regarding the participation request based on the user manipulating the mobile communications terminal 20 that received from the group call server 10 the participation request related to the group call start request sent from the outgoing call terminal 20b (S04). At that time, the mobile communications terminal 20 receives the call ID the ID manager 32 transmitted from the group call server 10. The received call ID is stored in the redial information manager 33 together with the call history of the call in question.

When receiving the reply in question, at the group call server 10, the group communications function provider 11 allows the mobile communications terminal 20 to participate in the group call. When there are replies from one or more mobile communications terminals 20, the group call is established (S05). Here, at the group call server 10, the group communications function provider 11 manages the group call participation status of the various terminals 20 that have joined the group call. Moreover, in the respective mobile communications terminals 20, as well, the call status manager 34 manages the group call participation status of the terminals 20 by receiving information from the group call server 10.

Figure 4:
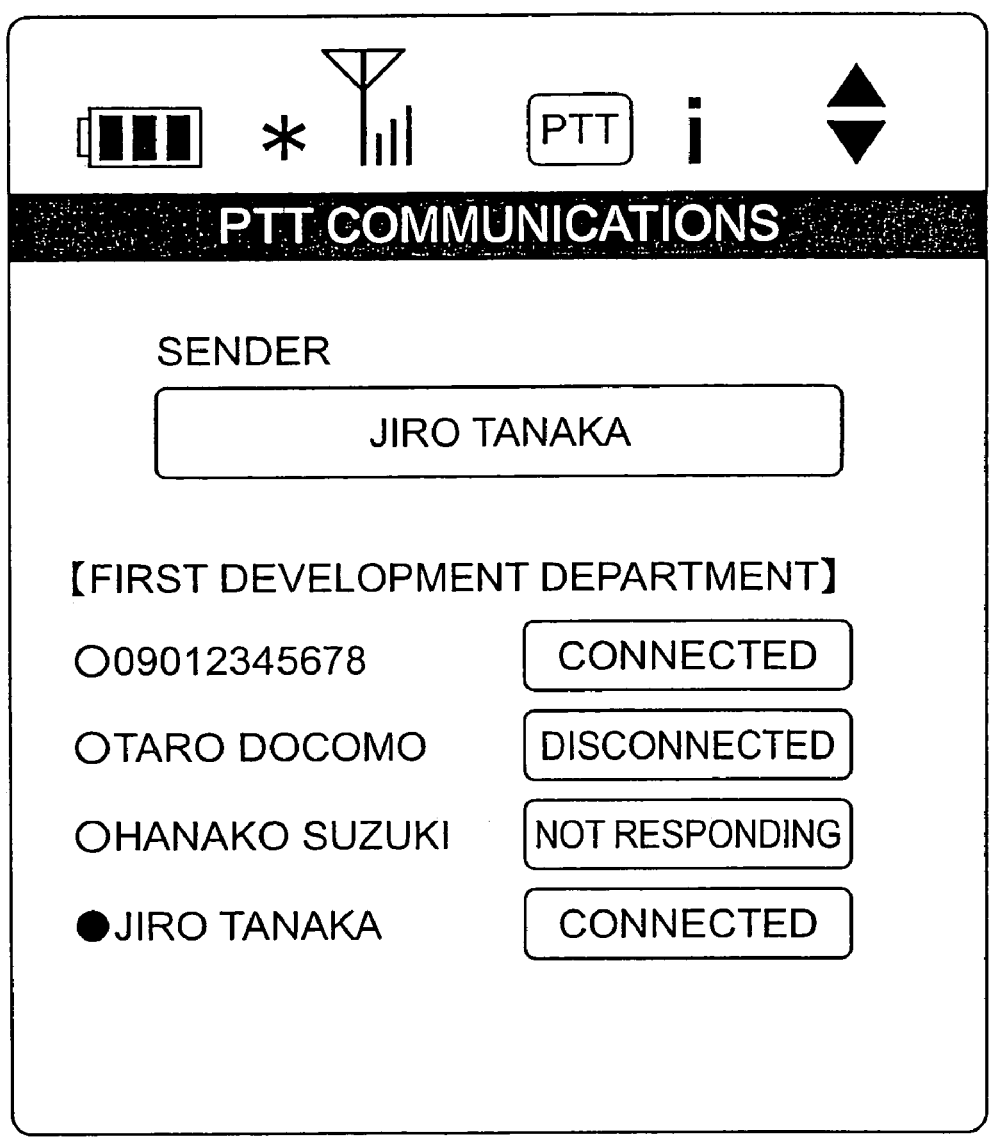
FIG. 4 is a diagram indicating the display of the mobile communications terminal 20 in the state when a group call has been established.

When a group call has been established, communication is possible between the mobile communications terminals 20 participating in the group call. When executing a group call, at the mobile communications terminal 20, the display unit 22 executes a display relating to the group call, such as that in FIG. 4. As indicated in FIG. 4, the caller of the group call, the users who are participating in the group call, and the participation status are displayed.

After the group call has been established as described above, the rejoining terminal 20a is disconnected from the call (S06). This disconnection from the group call may be based on the manipulations of the user of the rejoining terminal 20a or may be based on disconnection from communications by the rejoining terminal 20a going outside the communications area of the mobile communications network. If disconnected from the group call based on disconnection from communications, preferably, the rejoining terminal 20a gives the user notification of the disconnection from the group call by using the display unit 22 to display such content. Moreover, if disconnected from the group call based being disconnected from communications, the group call server 10 can detect that the rejoining terminal 20a has been disconnected from the group call because of transmission errors from the call data sent to the rejoining terminal 20a. In addition, when the rejoining terminal 20a has been disconnected from the group call, the participation status of the rejoining terminal 20a, which is managed by the recall terminal 20a and the group call server 10 respectively, is updated to "disconnected". The group call continues based on the other mobile communications terminals 20 even after the rejoining terminal 20a has been disconnected from the group call.

Subsequently, in order for the rejoining terminal 20a to participate in the disconnected group call, the rejoin request transmission unit 35 transmits a rejoin request to the group call server 10 (S07). Here, the generator 36 acquires the call ID related to the group call to be rejoined, which is stored in the redial information manager 33, and generates a rejoin request that contains the related call ID. The transmission of this rejoin request is conducted, for example, by manipulations by the user. The interface used when rejoining based on manipulations by the user is preferably the same interface as that of the call history and redial used, for example, in a portable telephone. Specifically, it is best to display the call history related to the group call stored in the redial information manager 33 on the display unit 22, allow the user to reference this history, and then transmit the recall request by the user selecting the group call to be rejoined.

Here, if disconnected from the group call caused by the rejoining terminal 20a passing outside the communications area of the mobile communications network, the rejoining terminal 20a must enter into the communications area before rejoining. Here, the convenience may be heightened such that, for example, if the rejoining terminal 20a detects that the communications unit 21 has entered the communications area, the user is prompted to rejoin the group call by the display unit 22 displaying "Returned to the communications coverage area. Would you like to restart the group call?"

Continuing, at the group call server 10, the rejoin request reception unit 14 receives the applicable rejoin request. Next, the rejoin control unit 15 references the call ID contained in the applicable rejoin request, and controls the group call function provider 11 such that the rejoining terminal 20a is allowed to rejoin the group call identified by the related call ID (S08). The rejoining terminal 20a can rejoin the group call based on the applicably control (S09). When the rejoining terminal 20a has rejoined the group call, the participation status of the rejoining terminal 20a, which is controlled by the rejoining terminal 20a and the group call server 10 respectively, is updated to "Connected".

As described above, according to the group call system 1 configured to comprise the group call server 10 of the present embodiment, rejoining the group call is triggered by the transmission of a rejoin request from the rejoining terminal 20a (S07). Consequently, it is possible to rejoin the group call by spontaneous operation from the rejoining terminal 20a side (not by the group call server 10 side) and at an optional timing.

Further, in the above embodiment the terminal was a mobile communications terminal, but fixed communications terminals such as personal computers (PC) may also be used. Also in the above embodiment the communications network was a mobile communications network, but a communications network such as the internet may also be used. Moreover, the timing by which the call ID is notified is not limited to that explained in the aforementioned embodiment. For example, notification to the mobile communications terminal 20 participating in the group call in question may be given after the group call has been established.

Moreover, the aforementioned transmission of the rejoin request (S07) was, for example, conducted by the manipulations of the user, but other methods may also be used. For example, the functions of the request transmission control unit 37, which the rejoining terminal 20a comprises, may also be used. Specifically, at S06, the request transmission control unit 37 determines whether or not the local host terminal is positioned in the communications area of the mobile communications network, and control is executed such that the rejoin request is transmitted by the rejoin request transmission unit 35 based on the applicable determination.

Preferably, this function is used when disconnected from the group call based on disconnecting from communication by the rejoining terminal 20a passing outside the communications area of the mobile communications network. According to this configuration, the rejoining terminal 20a that was disconnected from the group call can automatically rejoin the group call, and the convenience of the group call on the mobile communications network is improved. However, if automatic participation in the group call is not executed, it is not always necessary for the mobile communications terminal 20 to comprise a request transmission control unit 37.

Figure 5:
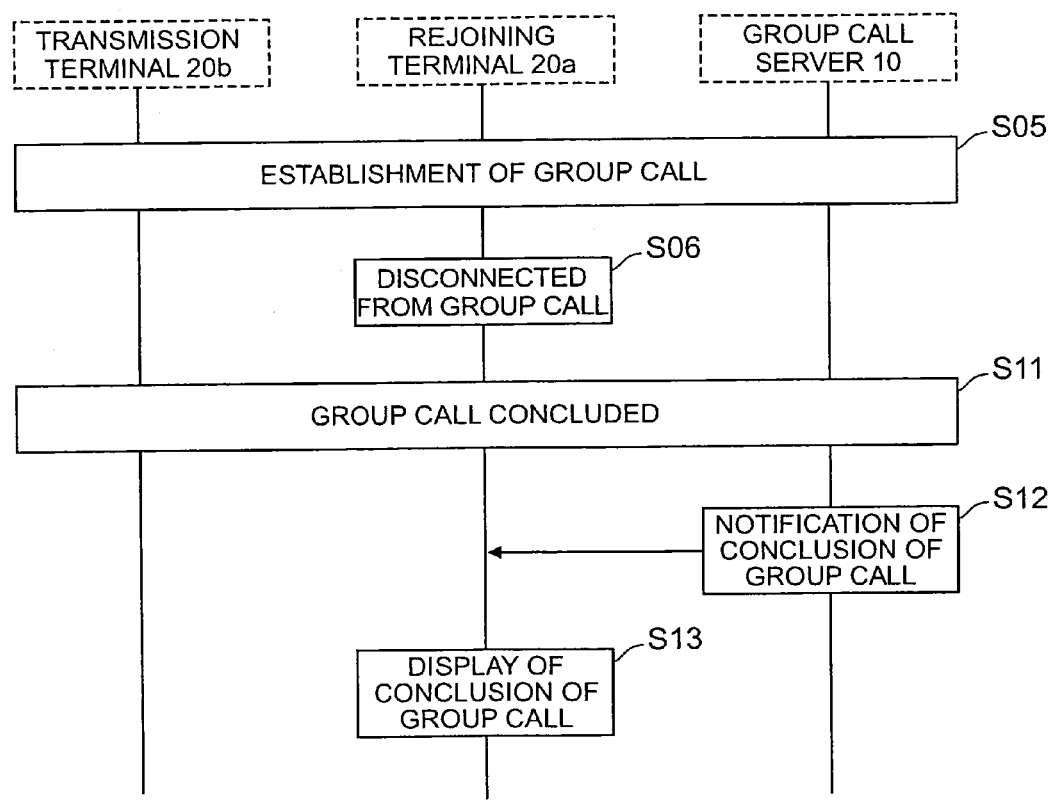
FIG. 5 is a sequence diagram indicating other processing executed by the group call system of the embodiment.

Moreover, if the group call in question ends after the rejoin request terminal 20a has been disconnected from the group call, the following processing may be conducted, which will be explained using the sequence diagram in FIG. 5.

First, the group call is established by the processing described above (S01 to S05). The rejoining terminal 20a is disconnected from the group call in the same manner as described above (S06). Afterwards, the group call ends (S11). The group call has ended, for example, when the mobile communications terminals 20 participating in the group call have disconnected from the group call in an orderly way, and the number of mobile communications terminals 20 participating in the group call in question becomes one.

When the group call ends, at the group communications server 10, the status notification unit 16 transmits to the mobile transmission terminals 20 disconnected from the group call in question, including the recall terminal 20a, information stating the group call in question has ended (S12).

At the mobile communications terminal 20, the display unit 22 receives and displays the applicable information to notify the user that that group call has ended (S13). Consequently, useless rejoin requests can be prevented because the user can determine whether or not the group call in which the user participated is continuing.

Moreover, notification of the status when the group call is continuing may be conducted at times other than when the group call has ended. Moreover, notification of the status may correspond to a request from the rejoining terminal 20a. However, the aforementioned processing is not always necessary, such as when it is not necessary to give notification of the group call status.

What is claimed is:

1. A terminal that conducts a group call by receiving, from a group call server, provision of a function of a group call between a plurality of terminals through a mobile communications network, comprising:
    means for participating in a group call by sending a group call start request to said group call server, or by receiving a participation request sent from said group call server based on a group call start request from another terminal;
    means for acquiring a call ID, which identifies the group call and is assigned by said group call server to the group call;

means for transmitting a request to rejoin said group call, which includes the call ID; and means for determining whether said terminal is positioned in a communications area of the mobile communications network, a request to rejoin being transmitted based on the determination.

2. The terminal according to claim 1, further comprising:

means for storing communications history related to group calls in which said terminal has participated, the communications history being stored in conjunction with the call ID related to the group call; and means for referencing the stored communications history and generating a rejoin request based on the stored communications history.

3. A group call control method causing a terminal to conduct group calls by receiving from a group call server provision of a function of a group call between a plurality of terminals through a mobile communications network, the method comprising:

participating, at a group call function controller, in a group call by sending a group call start request to the group call server, or by receiving a participation request sent from said group call server based on a group call start request from another terminal;

acquiring, at the group call function controller, a call ID, which identifies the group call and is assigned by said group call server to the group call;

transmitting, from a request transmission control unit, a request to rejoin the group call, which includes the call ID; and determining, at the request transmission control unit, whether said terminal is positioned in a communications area of the mobile communications network, a request to rejoin being transmitted based on the determination.

* * * * *